United States Patent [19]

Waryasz

[11] 4,238,923
[45] Dec. 16, 1980

[54] METHOD OF LOW TEMPERATURE HEAT UTILIZATION FOR ATMOSPHERIC PRESSURE COAL GASIFICATION

[75] Inventor: Richard E. Waryasz, Chicopee, Mass.
[73] Assignee: Combustion Engineering, Inc., Windsor, Conn.
[21] Appl. No.: 51,330
[22] Filed: Jun. 22, 1979
[51] Int. Cl.³ .......................... F02B 43/08; F02C 6/18
[52] U.S. Cl. ............................... 60/39.12; 60/39.18 B
[58] Field of Search ......... 60/39.12, 39.18 R, 39.18 B

[56] References Cited
U.S. PATENT DOCUMENTS

| 3,086,362 | 4/1963 | Foster-Pegg | 60/39.18 B |
|---|---|---|---|
| 3,804,606 | 4/1974 | Archer et al. | 60/39.12 |
| 3,849,662 | 11/1974 | Blaskowski et al. | 60/39.18 R |
| 4,058,974 | 11/1977 | Pfenninger | 60/39.12 |

*Primary Examiner*—Louis J. Casaregola
*Attorney, Agent, or Firm*—Robert L. Olson

[57] ABSTRACT

A combined cycle power plant having a steam generator and a gas turbine which makes use of a high temperature liquid couplant, or heat exchange arrangement, and a low temperature liquid couplant, or heat exchange arrangement, for maximizing use of the heat available in the power plant. The high temperature liquid couplant extracts heat from the gases leaving a coal gasifier, and is used in (1) a high temperature air heater for the gasifier, and (2) a high temperature fuel preheater of a steam generator. The low temperature liquid couplant extracts heat from the exhaust gases of the steam generator, and is used as (1) preheat for the high temperature liquid couplant, (2) low temperature air preheater for the gasifier, (3) a booster fan inlet heater, and (4) a low temperature fuel preheater for the steam generator.

3 Claims, 1 Drawing Figure

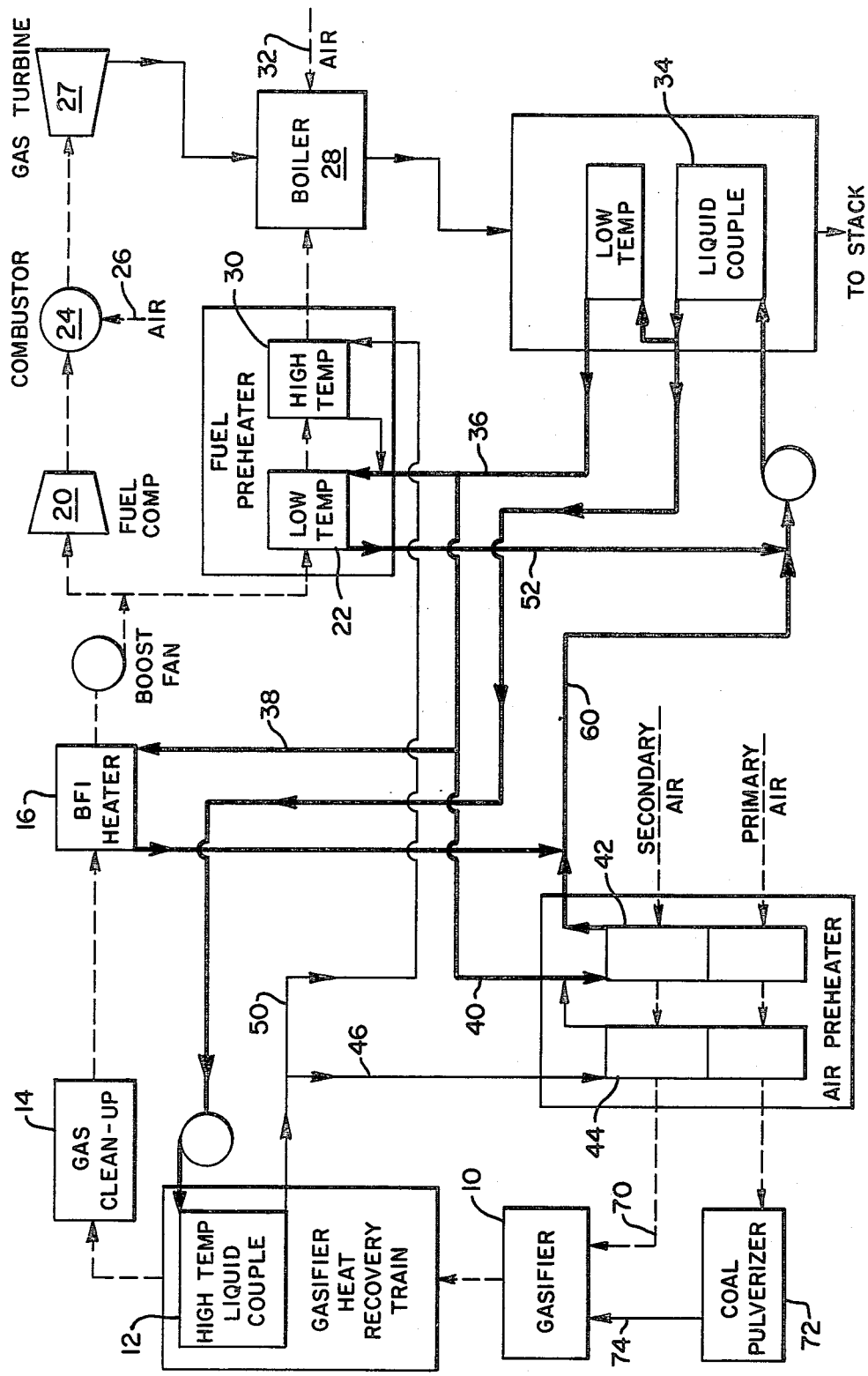

METHOD OF LOW TEMPERATURE HEAT UTILIZATION FOR ATMOSPHERIC PRESSURE COAL GASIFICATION

BACKGROUND OF THE INVENTION

One means of using coal in a relatively pollution-free manner to generate power is to burn the coal in a gasifier, producing a low BTU gas which can be used in a combined cycle, or a gas turbine and a steam generator, both of which drive electrical generators. In order to maximize efficiency of a combined cycle, it is necessary to utilize as much of the heat in the flue gases leaving the gasifier, steam generator, and the gas turbine as possible.

SUMMARY OF THE INVENTION

In accordance with the invention, a combined cycle power plant is provided which incorporates a high temperature liquid couplant or heat exchange arrangement, and a low temperature liquid couplant, or a heat exchange arrangement. Fluid is heated in a high temperature heat exchanger by the gases leaving a coal gasifier and the heat is used in a high temperature air heater for the gasifier, and a high temperature fuel preheater of a steam generator. A low temperature liquid couplant obtains heat from the exhaust gases of the steam generator, and is used in (1) preheat for the high temperature liquid couplant, (2) low temperature air preheater for the gasifier, (3) a booster fan inlet heater for the fuel, and (4) a low temperature fuel preheater for the steam generator.

BRIEF DESCRIPTION OF THE DRAWING

The drawing is a schematic of a combined cycle having a gas turbine, and a steam generator, incorporating both high and low liquid couplants in accordance with the invention.

DESCRIPTION OF THE PREFERRED EMBODIMENT

Looking now to the drawing, numeral 10 designates a coal gasifier for producing a low BTU gaseous fuel. In the gasifier, pulverized coal, air and steam are reacted, at a high temperature, to form a fuel gas containing primarily carbon monoxide and hydrogen, having a BTU value of 100-125 BTU/cubic feet. The gas produced in the gasifier passes through a high temperature liquid couplant heat exchanger 12, before being cleaned of particulate matter in the gas cleanup complex 14. Sulphur compounds, such as hydrogen sulphide, are also removed here by means of any of several well-known processes such as solvent absorption, or a dry absorption process. The low BTU gas exiting from the cleanup complex 14 passes through a booster fan inlet heater 16, where it is heated, before flowing to the booster fan 18. The gas flow then splits, with part of the gas flowing to the fuel compressor 20, and another portion going to a low temperature fuel preheater 22. The compressed fuel is burned in a combustor 24, which is supplied with compressed air through duct 26. The hot combustion gases drive a gas turbine 27, which in turn drives an electrical generator (not shown).

The exhaust from turbine 27, which is rich in oxygen and also contains considerable residual heat, can be used as combustion air in the steam boiler 28. Boiler 28 is supplied with low BTU gas from a high temperature heat exchanger 30. Additional combustion air 32 can be supplied to the boiler as needed.

The steam produced in generator 28 is used to drive an electrical generator (not shown). The exhaust gases from the boiler 28 are used to heat liquid in a low temperature heat exchanger 34, before being discharged to the atmosphere.

The low temperature liquid from heat exchanger 34 is used for a number of purposes. A first portion flows through line 36 to the fuel preheater 22. A second portion flows through line 38 to the booster fan inlet heat exchanger 16. A third portion flows through line 40 to a low temperature air preheater 42. A high temperature air preheater 44 receives heat from the heat exchanger 12 through line 46. Liquid also flows from heat exchanger 12 to the high temperature fuel preheater 30 through line 50. The high temperature liquid, after giving up heat in heat exchanger 30, flows through the low temperature fuel preheater 22, before returning through line 52 to the low temperature liquid couplant 34. Likewise, the liquid leaving high temperature air preheater 44 flows through the low temperature air preheater 42, before returning through line 60 to the liquid couplant 34.

The air heater discharges secondary air, which flows through duct 70 to the coal gasifier 10. Primary air flows from the air heater to a coal pulverizer 72 and then carries the pulverized coal through duct 74 to the gasifier.

From the above, it can be seen that a combined cycle power plant has been provided which makes use of all of the heat available, thus optimizing the efficiency of the unit.

What is claimed is:

1. A power generating plant comprising a coal gasifier in which gaseous fuel is generated, an air heater which supplies heated air to the gasifier, a gas cleanup complex downstream of the gasifier, a steam generator fired by the gaseous fuel, a gas turbine fired by said gaseous fuel, a booster fan downstream of the gas cleanup complex, a booster fan inlet heater upstream of the booster fan, a fuel preheater upstream of the steam generator for heating the gaseous fuel, a low temperature liquid couplant heat exchanger heated by the combustion exhaust gases from the steam generator, the liquid heated in the low temperature liquid couplant being used for heating in the air heater, the booster fan inlet heater, and the fuel preheater.

2. The power generating plant set forth in claim 1, including a high temperature liquid couplant heat exchanger heated by the flow of gaseous fuel upstream of the gas cleanup complex, the liquid heated in the high temperature liquid couplant heat exchanger being used for heating in the air heater and the fuel preheater for the steam generator.

3. The power generating plant set forth in claim 2, wherein a portion of the liquid heated in the low temperature liquid couplant heat exchanger flows to the high temperature liquid couplant heat exchanger.

* * * * *